(12) United States Patent
Hong et al.

(10) Patent No.: US 10,630,744 B2
(45) Date of Patent: Apr. 21, 2020

(54) METHOD, DEVICE, AND SYSTEM FOR SCHEDULING TRANSMISSION AND RECEPTION OF MEDIA CONTENTS

(71) Applicant: Samsung Electronics Co., Ltd., Suwon-si, Gyeonggi-do (KR)

(72) Inventors: Soon-gi Hong, Seoul (KR); Do-young Joung, Seoul (KR); Jeong-seok Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 54 days.

(21) Appl. No.: 15/312,059

(22) PCT Filed: May 19, 2015

(86) PCT No.: PCT/KR2015/005016
§ 371 (c)(1),
(2) Date: Nov. 17, 2016

(87) PCT Pub. No.: WO2015/178669
PCT Pub. Date: Nov. 26, 2015

(65) Prior Publication Data
US 2017/0111420 A1 Apr. 20, 2017

(30) Foreign Application Priority Data
May 20, 2014 (KR) .................. 10-2014-0060486

(51) Int. Cl.
*G06F 15/16* (2006.01)
*H04L 29/06* (2006.01)
(Continued)

(52) U.S. Cl.
CPC ........ *H04L 65/601* (2013.01); *H04L 65/4084* (2013.01); *H04L 65/80* (2013.01);
(Continued)

(58) Field of Classification Search
CPC ... H04L 65/601; H04L 65/4084; H04L 65/80; H04L 67/42
(Continued)

(56) References Cited

U.S. PATENT DOCUMENTS 8,145,721 B2 3/2012 Olsson et al.
8,224,981 B2 7/2012 Vardi et al.
(Continued)

FOREIGN PATENT DOCUMENTS

| CN | 101622846 A | 1/2010 |
|---|---|---|
| EP | 2 477 397 A1 | 1/2011 |

(Continued)

OTHER PUBLICATIONS

European Search Report dated Oct. 27, 2017, issued in the European Application No. 15796789.4-1908 / 3148201.
(Continued)

*Primary Examiner* — Liang Che A Wang
*Assistant Examiner* — Kaylee J Huang
(74) *Attorney, Agent, or Firm* — Jefferson IP Law, LLP

(57) ABSTRACT

Disclosed is a method, performed by a client, of scheduling reception of media contents, the method including determining a plurality of network connections enabling the reception of the media contents between the client and a server, predicting a buffering timing at which segments of the media contents received in a unit of a buffer size of the client are received through some of the determined plurality of network connections, generating scheduling information for allocating the segments of the media contents to be allocated to the some network connections to each of the plurality of network connections at the predicted buffering timing, and transmitting the generated scheduling information to the server.

9 Claims, 16 Drawing Sheets

(51) Int. Cl.
*H04N 21/262* (2011.01)
*H04N 21/6373* (2011.01)
*H04N 21/24* (2011.01)
*H04N 21/6377* (2011.01)

(52) U.S. Cl.
CPC ......... *H04L 67/42* (2013.01); *H04N 21/2401* (2013.01); *H04N 21/2402* (2013.01); *H04N 21/262* (2013.01); *H04N 21/6373* (2013.01); *H04N 21/6377* (2013.01)

(58) Field of Classification Search
USPC .......................... 709/201, 203, 231, 232, 236
See application file for complete search history.

(56) References Cited

U.S. PATENT DOCUMENTS

| | | | |
|---|---|---|---|
| 8,386,621 B2 | 2/2013 | Park et al. | |
| 2004/0093420 A1* | 5/2004 | Gamble | H04L 67/06 709/231 |
| 2006/0007882 A1* | 1/2006 | Zeng | H04L 45/00 370/328 |
| 2006/0244824 A1* | 11/2006 | Debey | G09B 5/065 348/100 |
| 2007/0070906 A1* | 3/2007 | Thakur | H04L 69/16 370/235 |
| 2008/0022005 A1 | 1/2008 | Wu et al. | |
| 2008/0263227 A1* | 10/2008 | Roberts | H04L 67/1095 709/248 |
| 2010/0186054 A1* | 7/2010 | Youn | H04N 21/26275 725/103 |
| 2011/0225302 A1* | 9/2011 | Park | H04L 65/4084 709/227 |
| 2013/0095806 A1* | 4/2013 | Salkintzis | H04L 65/601 455/414.3 |
| 2013/0128113 A1 | 5/2013 | Won et al. | |
| 2013/0311614 A1* | 11/2013 | Salkintzis | H04W 76/025 709/219 |
| 2014/0314055 A1 | 10/2014 | Lee et al. | |
| 2014/0317060 A1* | 10/2014 | Shen | G06F 11/1464 707/652 |
| 2014/0317241 A1* | 10/2014 | Zhao | H04L 65/608 709/219 |

FOREIGN PATENT DOCUMENTS

| | | |
|---|---|---|
| KR | 10-0924309 B1 | 11/2009 |
| KR | 10-2010-0058786 A | 6/2010 |
| KR | 10-2010-0059117 A | 6/2010 |
| KR | 10-2012-0011774 A | 2/2012 |
| KR | 10-2013-0053230 A | 5/2013 |
| WO | 2011/150644 A1 | 12/2011 |

OTHER PUBLICATIONS

Chinese Office Action dated Oct. 23, 2018; Ref #: 2018101801548640; App #: 201580026989.6.

* cited by examiner

FIG. 4
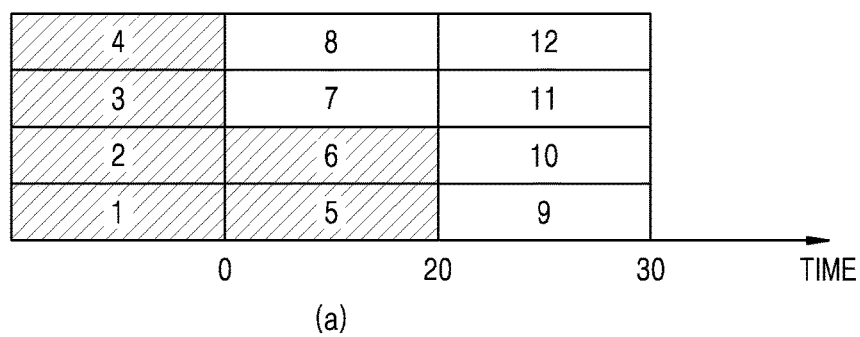
(a)
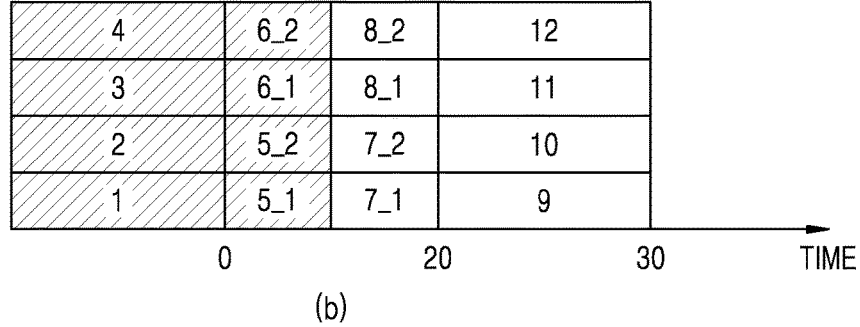
(b)

METHOD, DEVICE, AND SYSTEM FOR SCHEDULING TRANSMISSION AND RECEPTION OF MEDIA CONTENTS

TECHNICAL FIELD

The present disclosure relates to a method, device, and system for scheduling transmission and reception of media contents, and more particularly, to a method of scheduling reception of media contents at a client, and the client, a method of scheduling transmission of media contents at a server, and the server, a method of scheduling transmission and reception of media contents at a second server, and the second server, and a system for scheduling transmission and reception of media contents.

BACKGROUND ART

With the development of wireless communication networks, users may be provided with various types of media contents from a server and use the media contents. Media contents are transmitted to user's devices from a server through streaming. When streaming media contents, a time needed to buffer the media contents is one of important factors for determining quality with respect to providing of the media contents.

Recently, much research has been conducted to reduce the time needed for buffering the media contents when streaming the media contents. In particular, methods of efficiently scheduling media contents transmitted and received through at least one network connection between a server and a user's terminal are being actively studied.

DETAILED DESCRIPTION OF THE INVENTION

Technical Problem

The present disclosure provides a method, apparatus, and system for scheduling transmission and reception of media contents to reduce a time needed for a client to receive the media contents by scheduling the media contents transmitted from a server to the client in transmission and reception of the media contents between the client and the server.

Technical Solution

Disclosed is a method, performed by a client, of scheduling reception of media contents, the method including determining a plurality of network connections enabling the reception of the media contents between the client and a server, predicting a buffering timing at which segments of the media contents received in a unit of a buffer size of the client are received through some of the determined plurality of network connections, generating scheduling information for allocating the segments of the media contents to be allocated to the some network connections to each of the plurality of network connections at the predicted buffering timing, and transmitting the generated scheduling information to the server.

BRIEF DESCRIPTION OF THE DRAWINGS

FIG. 4 is a view for describing a method of predicting a time needed to receive media contents based on a size of a buffer and the number of plural network connections at a client, according to an embodiment;

BEST MODE

Figure 1:
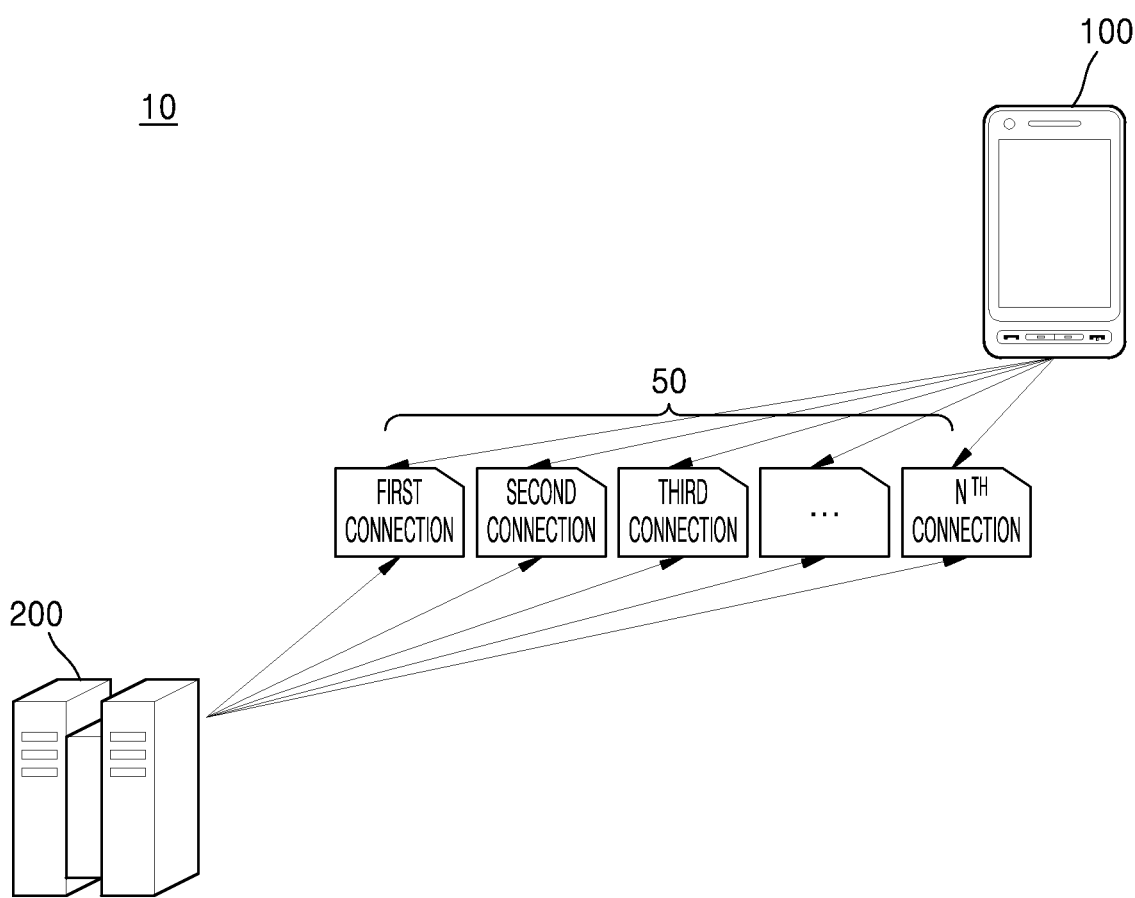
FIG. 1 is a conceptual view for describing a system for scheduling transmission and reception of media contents, according to an embodiment.

A method, performed by a client, of scheduling reception of media contents according to an embodiment may include determining a plurality of network connections enabling the reception of the media contents between the client and a server, predicting a buffering timing at which segments of the media contents received in a unit of a buffer size of the client are received through some of the determined plurality of network connections, generating scheduling information for allocating the segments of the media contents to be allocated to the some network connections to each of the plurality of network connections at the predicted buffering timing, and transmitting the generated scheduling information to the server.

In the method, performed by the client, of scheduling reception of media contents according to an embodiment, the scheduling information may include a request for changing a size of the segments of the media contents if the segments of the media contents are allocated to the some network connections.

In the method, performed by the client, of scheduling reception of media contents according to an embodiment, the scheduling information may include segment size information of a segment allocatable to each of the plurality of network connections.

In the method, performed by the client, of scheduling reception of media contents according to an embodiment, the generating of the scheduling information may include comparing a first reception time, in which the segments of the media contents are received through the some network connections, with a second reception time, in which the segments of the media contents are received through the plurality of network connections, and the transmitting of the generated scheduling information may include transmitting the generated scheduling information based on a result of the comparing of the first reception time with the second reception time.

In the method, performed by the client, of scheduling reception of media contents according to an embodiment, the transmitting of a scheduling request may further include transmitting the scheduling request to the server if the first reception time is greater than the second reception time by a threshold value.

In the method, performed by the client, of scheduling reception of media contents according to an embodiment, the generating of the scheduling information may include extracting segment size information about a size of a segment of the media contents from a lookup table that defines a relationship between a number of a plurality of network connections and a buffer size and the size of the segment of the media contents allocated to each of the plurality of network connections.

The method, performed by the client, of scheduling reception of media contents according to an embodiment may further include receiving the media contents, based on the transmitted scheduling information.

In the method, performed by the client, of scheduling reception of media contents according to an embodiment, the receiving of the media contents may include receiving sub-segments generated as a result of dividing the segments of the media contents, based on the generated scheduling information by the server.

In the method, performed by the client, of scheduling reception of media contents according to an embodiment, the receiving of the sub-segments may include at least one sub-segment of an identical number from each of the plurality of network connections.

In the method, performed by the client, of scheduling reception of media contents according to an embodiment, the receiving of the at least one sub-segment may include determining a number of sub-segments allocated to each of the plurality of network connections based on a ratio of data transmission rates of the plurality of network connections, if the data transmission rates of the plurality of network connections are different.

A method, performed by a server, of scheduling transmission of media contents according to an embodiment may include determining a plurality of network connections enabling reception of the media contents between a client and the server, predicting a buffering timing at which segments of the media contents received in a unit of a buffer size of the client are received through some of the determined plurality of network connections, and performing scheduling to allocate the segments of the media contents to be allocated to the some network connections to each of the plurality of network connections at the predicted buffering timing.

A method, performed by a second server, of scheduling transmission and reception of media contents according to an embodiment includes determining a plurality of network connections enabling the reception of the media contents between a client and a first server, predicting a buffering timing at which segments of the media contents received by the client in a unit of a buffer size of the client are received through some of the determined plurality of network connections, generating scheduling information for allocating the segments of the media contents to be allocated to the some network connections to each of the plurality of network connections at the predicted buffering timing, and transmitting the generated scheduling information to the first server.

A client for scheduling reception of media contents according to an embodiment includes a controller configured to determine a plurality of network connections enabling the reception of the media contents between the client and a server, a scheduler configured to predict a buffering timing at which segments of the media contents received in a unit of a buffer size of the client are received through some of the determined plurality of network connections, and to generate scheduling information for allocating the segments of the media contents to be allocated to the some network connections to each of the plurality of network connections at the predicted buffering timing, and a communicator configured to transmit the generated scheduling information to the server.

A server for scheduling transmission of media contents according to an embodiment includes a controller configured to determine a plurality of network connections enabling reception of the media contents between a client and the server and a scheduler configured to predict a buffering timing at which segments of the media contents received in a unit of a buffer size of the client are received through some of the determined plurality of network connections and to perform scheduling for allocating the segments of the media contents to be allocated to the some network connections to each of the plurality of network connections at the predicted buffering timing.

A second server for scheduling transmission and reception of media contents according an embodiment includes a controller configured to determine a plurality of network connections enabling the reception of the media contents between a client and a first server, a scheduler configured to predict a buffering timing at which segments of the media contents received by the client in a unit of a buffer size of the client are received through some of the determined plurality of network connections, and to generate scheduling information for allocating the segments of the media contents to be allocated to the some network connections to each of the plurality of network connections at the predicted buffering timing, and a communicator configured to transmit the generated scheduling information to the first server.

A system for scheduling transmission and reception of media contents according to an embodiment performs predicting a buffering timing at which segments of the media contents received in a unit of a buffer size of the client are received through some of the determined plurality of network connections, generating scheduling information for allocating the segments of the media contents to be allocated to the some network connections to each of the plurality of network connections at the predicted buffering timing, transmitting the generated scheduling information to the server, and transmitting divided segments of the media contents, based on the transmitted scheduling information.

MODE OF THE INVENTION

Terms used herein will be described in brief, and the present disclosure will be described in detail.

Although terms used in the present disclosure are selected with general terms popularly used at present under the consideration of functions in the present disclosure, the terms may vary according to the intention of those of ordinary skill in the art, judicial precedents, or introduction of new technology. In addition, in a specific case, the applicant voluntarily may select terms, and in this case, the meaning of the terms is disclosed in a corresponding description part of the disclosure. Thus, the terms used in the present disclosure should be defined not by the simple names of the terms but by the meaning of the terms and the contents throughout the present disclosure.

Throughout the entirety of the specification of the present disclosure, if it is assumed that a certain part includes a certain component, the term 'including' means that a corresponding component may further include other components unless a specific meaning opposed to the corresponding component is written. The term used in the embodiments such as "unit" or "module" indicates a unit for processing at least one function or operation, and may be implemented in hardware, software, or in a combination of hardware and software.

Hereinafter, embodiments of the present disclosure will be described in detail with reference to the attached drawings to allow those of ordinary skill in the art to easily carry out the embodiments. However, the present disclosure may be implemented in various forms, and are not limited to the embodiments described herein. To clearly describe the present disclosure, parts that are not associated with the description have been omitted from the drawings, and throughout the specification, identical reference numerals refer to identical parts.

FIG. 1 is a conceptual view for describing a system 10 for scheduling transmission and reception of media contents, according to an embodiment. Referring to FIG. 1, the system 10 (hereinafter, referred to as 'scheduling system') for scheduling transmission and reception of media contents may include a client device 100 and a server 200.

The scheduling system 10 illustrated in FIG. 1 includes elements associated with the current embodiment. Thus, it would be understood by those of ordinary skill in the art that general-purpose elements other than the elements illustrated in FIG. 1 may also be included in the scheduling system 10.

According to an embodiment, the client 100 transmits data to and receives data from the server 200. For example, the client 100 may transmit media contents to and receive media contents from the server 200. However, this is only an example, and the client 100 may communicate with a device other than the server 200, such as a proxy server. Data that may be transmitted to and received from the server 200 by the client 100 is not limited to the media contents, but herein, for convenience, data will be described as media contents.

The client 100 receives media contents from the server 200 through a plurality of network connections 50 in a streaming manner. The client 100 may include a buffer capable of storing media contents to receive the media contents from the server 200 in the streaming manner. However, this is only an example, and the buffer capable of storing media contents may exist outside the client 100.

The client 100 also generates scheduling information for scheduling transmission of media contents at the server 200. The client 100 according to an embodiment may generate scheduling information based on the number of plural network connections 50 with the server 200 or a size of a buffer of the client 100. A method of generating the scheduling information at the client 100 will be described in detail with reference to FIG. 2.

The client 100 may be implemented in various forms. For example, the client 100 described herein may be, but is not limited to, a cellular phone, a smartphone, a laptop computer, a tablet personal computer (PC), or the like.

The server 200 according to an embodiment transmits media contents to the client 100. The server 200 transmits media contents stored inside or outside the server 200 to the client 100 through the plurality of network connections 50 between the server 200 and the client 100.

The server 200 transmits the media contents to the client 100 according to the scheduling information generated based on the number of plural network connections 50 or the buffer size of the client 100. For example, when transmitting the media contents to the client 100 according to the generated scheduling information, the server 200 may determine a size of a segment that is the unit of transmission of the media contents. A method of transmitting the media contents to the client 100 at the server 200 according to the generated scheduling information will be described in detail with reference to FIGS. 2 through 4.

According to an embodiment, the scheduling information may be generated by the client 100 and transmitted to the server 200. However, this is only an example embodiment and the present disclosure is not limited to this embodiment. According to another embodiment, the server 200 generates scheduling information based on the number of plural network connections 50 with the server 200 or the buffer size of the client 100. According to another embodiment, the server 200 obtains scheduling info nation that is generated by another device such as a proxy server based on the number of plural network connections 50 with the server 200 or the buffer size of the client 100.

Figure 2:
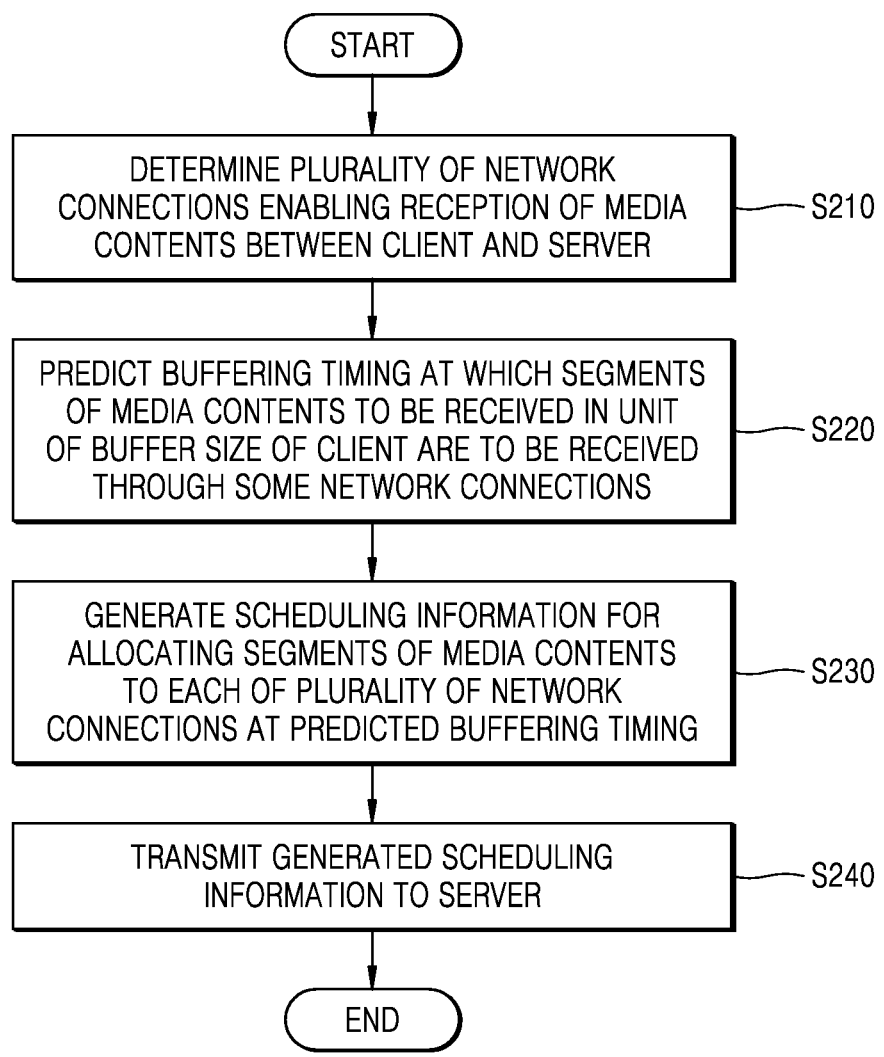
FIG. 2 is a flowchart illustrating a method of performing scheduling for receiving media contents at a client, according to an embodiment.

FIG. 2 is a flowchart illustrating a method of transmitting scheduling information for receiving media contents to the server 200 at the client 100, according to an embodiment.

In operation S210, the client 100 determines the plurality of network connections 50 enabling the reception of the media contents between the client 100 and the server 200. The client 100 monitors a status of a network established between the client 100 and the server 200 to determine the plurality of network connections 50 connecting the client 100 with the server 200. The Client 100 obtains information about the number of determined plural network connections 50.

In operation S220, the client 100 predicts a buffering timing at which segments of media contents to be received in the unit of the buffer size of the client 100 are to be received through some of the determined plural network connections 50.

If the client 100 receives media contents from the server 200 through streaming, the client 100 may receive media contents corresponding to the buffer size once entering a buffering mode, and then switch to a play mode. The client 100 predicts a time needed to receive the media contents in the buffering mode based on the buffer size and the number of plural network connections 50.

The client 100 determines whether segments are allocated to the respective plural network connections 50 with the server 200. Herein, the segment may be the unit of transmission of the media contents from the server 200 to the client 100. However, this is merely an example embodiment, and the unit of transmission of the media contents is not limited to the segment.

Allocation of segments to the respective plural network connections 50 between the client 100 and the server 200 may require a shorter time to receive the media contents than allocation of segments to some of the plural network connections 50.

Hereinbelow, a detailed description will be given, with reference to FIG. 4, of a method of predicting a time needed to receive media contents, based on the buffer size and the number of plural network connections 50.

(a) of FIG. 4 shows a graph regarding a time needed for the client 100 to receive segments, if the number of plural network connections between the client 100 and the server 200 is 4 and if 6 segments of a preset size are transmitted. Herein, the 6 segments of a preset size are received before the client 100 switches from the buffering mode to the play mode, and may have a size corresponding to the buffer size of the client 100.

Referring to the graph shown in (a) of FIG. 4, segments needed to switch to the play mode from the buffering mode are allocated to each of the plural network connections (a first connection, a second connection, a third connection, and a fourth connection) during a unit time U. During subsequent unit times (U to 2 U), the two remaining segments among the 6 segments for switching from the buffering mode to the play mode transmitted from the server 200 are allocated to the first connection and the second connection. Herein, the two remaining segments are allocated to some of the plurality of network connections 50, instead of each of the network connections 50, and these segments will be referred to as remaining segments.

If segments are allocated to some (the first connection and the second connection) of the plurality of network connections (the first connection, the second connection, the third connection, and the fourth connection), the remaining network connections do not involve segment transmission for switching from the buffering mode to the play mode. As a result, segments to be transmitted to the client 100 are not efficiently distributed, requiring more time to switch from the buffering mode to the play mode.

Referring to the graph shown in (b) of FIG. 4, like in (a) of FIG. 4, segments needed to switch to the play mode from the buffering mode are allocated to each of the plural network connections (the first connection, the second connection, the third connection, and the fourth connection) during the unit time U. However, after the unit time U, a preset segment size is changed to allocate the segments to each of the plural network connections, shortening a time for transmission of the remaining two segments to 0.5 U.

Referring back to FIG. 2, to minimize a time needed to switch from the buffeting mode to the play mode, the client 100 according to an embodiment predicts, based on Equation (1), a timing at which segments are allocated to each of some network connections.

$$R = S - A \times N, \quad A = \left[\frac{S}{N}\right] \quad \text{Equation 1}$$

In Equation (1), S indicates a size of a buffer of the client 100, and N indicates the number of plural network connections 50. In Equation (1), A indicates a value obtained by reducing one unit time from a unit time needed for transmission of all segments to the buffer of the client 100 using the plural network connections 50. Herein, one unit time refers to a time needed to transmit a segment of a preset size from the server 200 to the client 100 through a network connection. R indicates the number of remaining segments the client 100 has to receive to switch from the buffering mode to the play mode after the elapse of a unit time A.

If a value R calculated based on a size S of the buffer of the client 100 and the number N of plural network connections 50 does not equal 0, the client 100 according to an embodiment may determine that a segment is allocated to some network connections during the last unit time in a time needed for switchover from the buffering mode to the play mode.

For example, if the buffer size of the client 100 is 6 and the number of plural network connections 50 is 4, A and R may be calculated based on Equation 1, and then the client 100 may receive the two (R) remaining segments during a second unit time after the elapse of a first unit time (the unit time A). The client 100 predicts that there are the remaining segments to be allocated to only some network connections during the second unit time.

In operation S230, the client 100 generates scheduling information for allocating the remaining segments to be allocated to some network connections to each of the plurality of network connections at the predicted buffering timing. Herein, the scheduling information may include segment size information for allocating the remaining segments to be allocated to some network connections to each of the plurality of network connections 50. For example, the segment size information may include sub-segment size information for allocating the remaining segments to be allocated to some network connections to each of the plurality of network connections 50.

According to an embodiment, the sub-segment size information for allocating the remaining segments to be allocated to some network connections to each of the plurality of network connections 50 may be determined based on Equation (2).

$$D = \left[\frac{N}{R}\right] \quad \text{Equation 2}$$

In Equation (2), N indicates the number of plural network connections 50, and R indicates the number of remaining segments the client 100 has to receive to switch from the buffering mode to the play mode after the elapse of the unit time A. Herein, A indicates a value obtained by reducing one unit time from a unit time needed for transmission of all segments to the buffer of the client 100 using the plural network connections 50. D, which is calculated as a result of solving Equation (2), indicates the number of network connections allocated for each remaining segment to receive R remaining segments through each of the plurality of network connections.

For example, if the buffer size of the client 100 is 6 and the number of plural network connections 50 is 4, N has a value of 4, A has a value of 1, and R has a value of 2. D has a value of 2 based on Equation (2). This means that to transmit two remaining segments using each of four network connections, the number of network connections allocated to one remaining segment is 2.

In operation S240, the client 100 transmits the generated scheduling information to the server 200. The server 200 according to an embodiment changes the preset size of the segments based on the scheduling information received from the client 100. The server 200 allocates generated sub-segments having the changed size to each of the plurality of network connections, based on the scheduling information.

For example, the scheduling information may include information about the number of network connections allocated to each remaining segment to receive the remaining segments allocated to some network connections in each of the plurality of network connections. If the information about the number of network connections allocated to each remaining segment is 2, the server 200 changes the size of the remaining segment such that one remaining segment is transmitted to the client 100 through two network connections.

Figure 3:
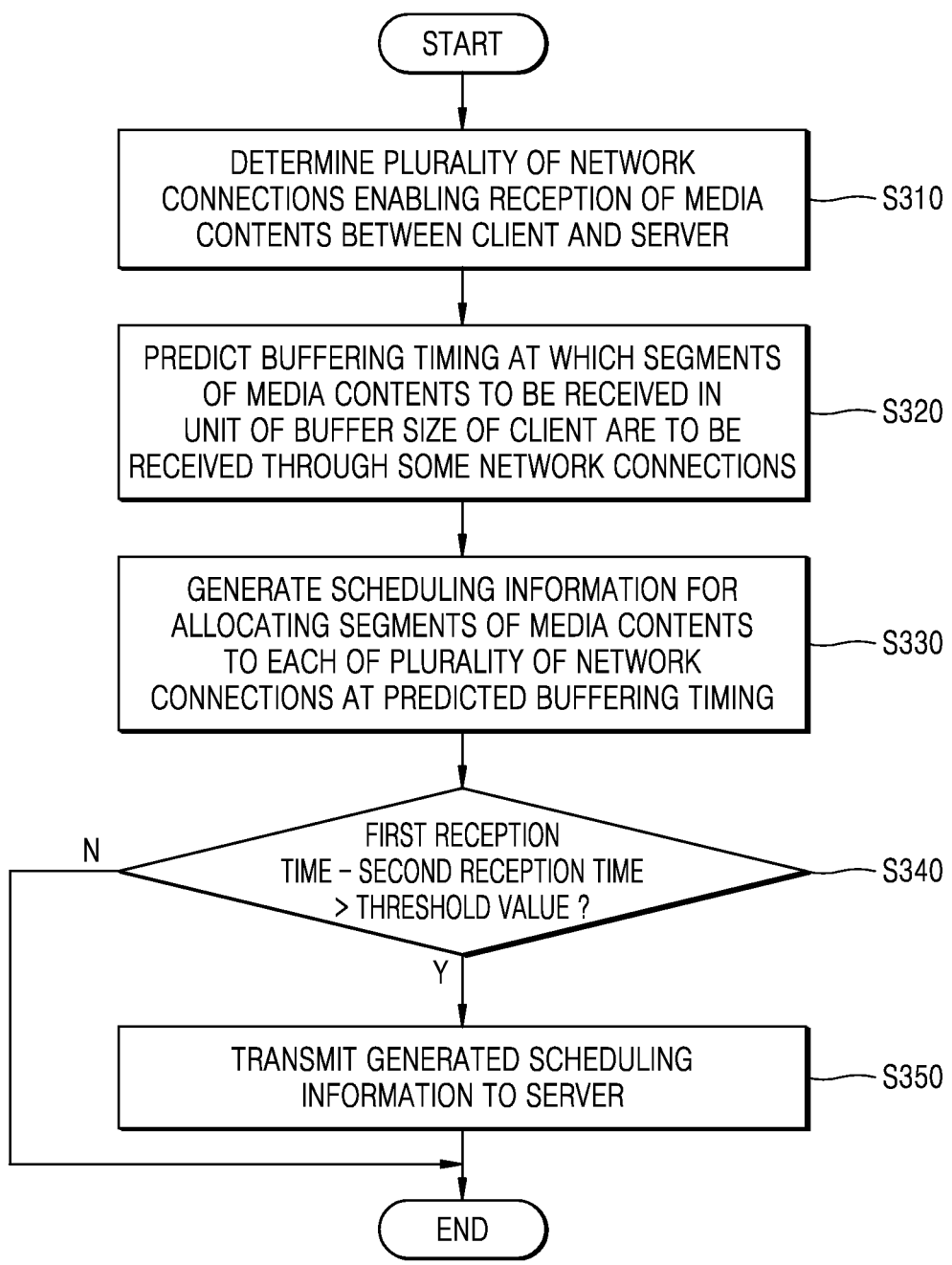
FIG. 3 is a flowchart illustrating a method of determining whether to perform scheduling by predicting a scheduling effect upon reception of media contents at a client, according to an embodiment.

FIG. 3 is a flowchart illustrating a method of determining whether to perform scheduling by predicting a scheduling effect upon reception of media contents at the client 100, according to an embodiment.

In operation S310, the client 100 determines the plurality of network connections 50 enabling the reception of the media contents between the client 100 and the server 200. The client 100 according to an embodiment obtains information about the number of determined plural network connections 50. Operation S310 may correspond to operation S210 of FIG. 2.

In operation S320, the client 100 predicts a buffering timing at which segments to be received in the unit of the buffer size of the client 100 are to be received through some of the determined plural network connections 50. Operation S320 may correspond to operation S220 of FIG. 2.

In operation S330, the client 100 generates scheduling information for allocating the remaining segments to be allocated to some network connections to each of the plurality of network connections at the predicted buffering timing. Herein, the scheduling information may include segment size information for allocating the remaining segments to be allocated to some network connections to each of the plurality of network connections 50. Operation S330 may correspond to operation S230 of FIG. 2.

In operation S340, the client 100 determines whether a difference between a first reception time, in which the remaining segments are received through some network connections and a second reception time, in which the remaining segments are received through the plurality of network connections 50 based on the generated scheduling information exceeds a threshold value.

If the difference between the first reception time and the second reception time exceeds the threshold value, the client 100 may determine that generation of the scheduling information has the effect of shortening a time needed to receive the segments. Whether the difference between the first reception time and the second reception time exceeds the threshold value may be determined based on Equation (3).

$$E = \left[\frac{N}{S - \left[\frac{S}{N}\right] \times N}\right] > 1 \qquad \text{Equation 3}$$

In Equation (3), N indicates the number of plural network connections 50 and S indicates the buffer size. E calculated using Equation (3) is a parameter indicating the effect of shortening a time needed to receive the remaining segments through scheduling.

If E is greater than the threshold value of 1, the client 100 may determine that generation of the scheduling information has the effect of shortening the time needed to receive the remaining segments. The threshold value of 1 is merely an example embodiment of the present disclosure, and the threshold value may be set to various values.

In operation S350, the client 100 transmits the generated scheduling information to the server 200. If it is determined that generation of the scheduling information has the effect of shortening the time needed to receive the remaining segments, the client 100 according to an embodiment transmits the generated scheduling information to the server 200.

If it is determined that the difference between the first reception time and the second reception time does not exceed the threshold value in operation S340, the client 100 may not transmit the scheduling information to the server 200. The client 100 determines whether to perform scheduling based on the prediction of the scheduling effect, thereby reducing a time taken for scheduling of reception of media contents.

Figure 5:
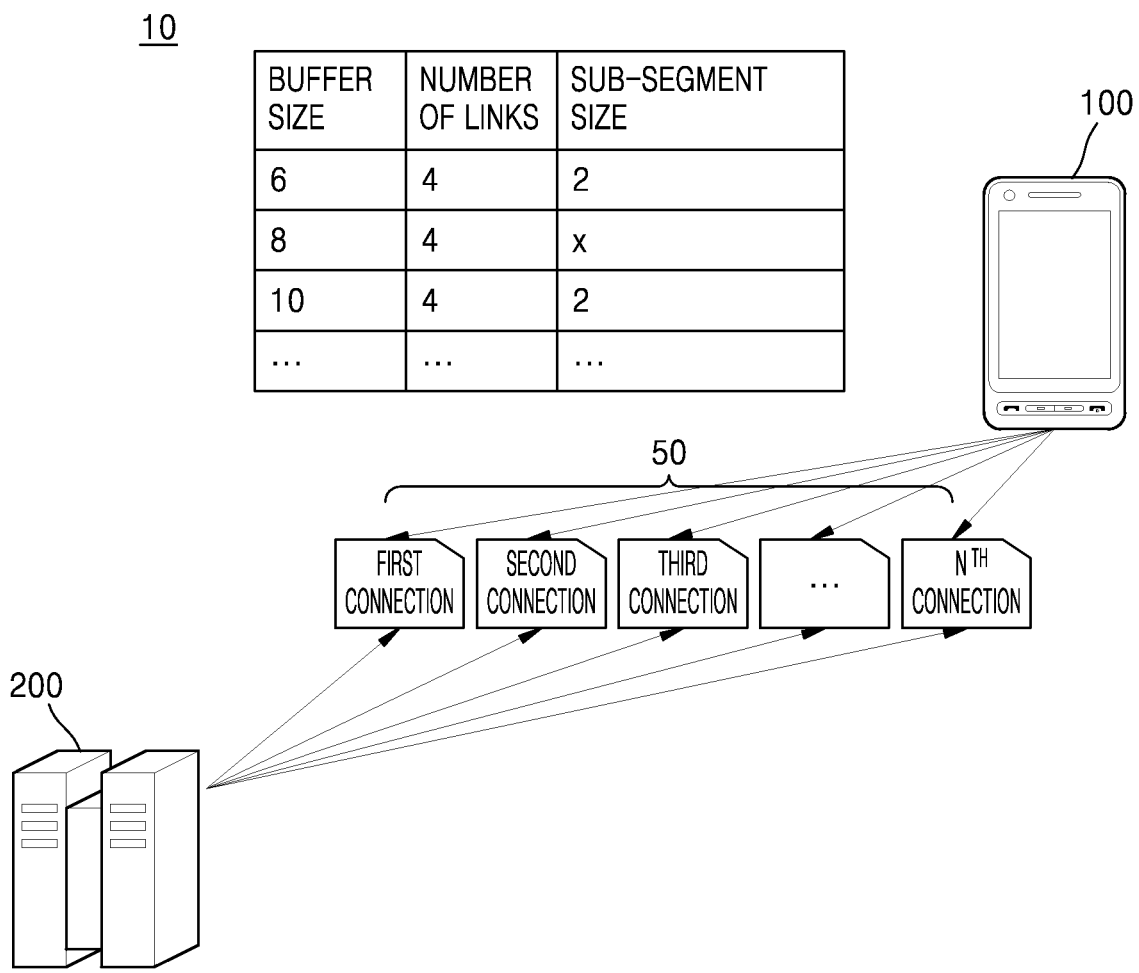
FIG. 5 is a view for describing a method of generating scheduling information by using a lookup table at a client, according to an embodiment.

FIG. 5 is a view for describing a method of generating scheduling information by using a lookup table at the client 100, according to an embodiment.

The client 100 may generate scheduling information from a lookup table which defines a relationship between the number of plural network connections 50 and the buffer size of the client 100, and a size of a segment allocated to each of the plurality of network connections 50.

For example, the client 100 may determine the number N of plural network connections 50 with the server 200 by monitoring a network state and obtain the buffer size S of the client 100. The client 100 extracts segment size information for allocating a segment to each of the plurality of network connections 50 from the lookup table when the number of network connections 50 is N and the buffer size is S. The client 100 may shorten a time needed to generate the scheduling information by extracting the segment size information from the lookup table.

According to another embodiment, the lookup table may include scheduling effect information. The client 100 may also reduce a time needed to determine whether to perform scheduling, by extracting the scheduling effect information corresponding to the number of plural network connections 50 and the buffer size of the client 100 from a previously stored lookup table.

The lookup table may be stored inside the client 100 or in an external device communicatable with the client 100.

Figure 6:
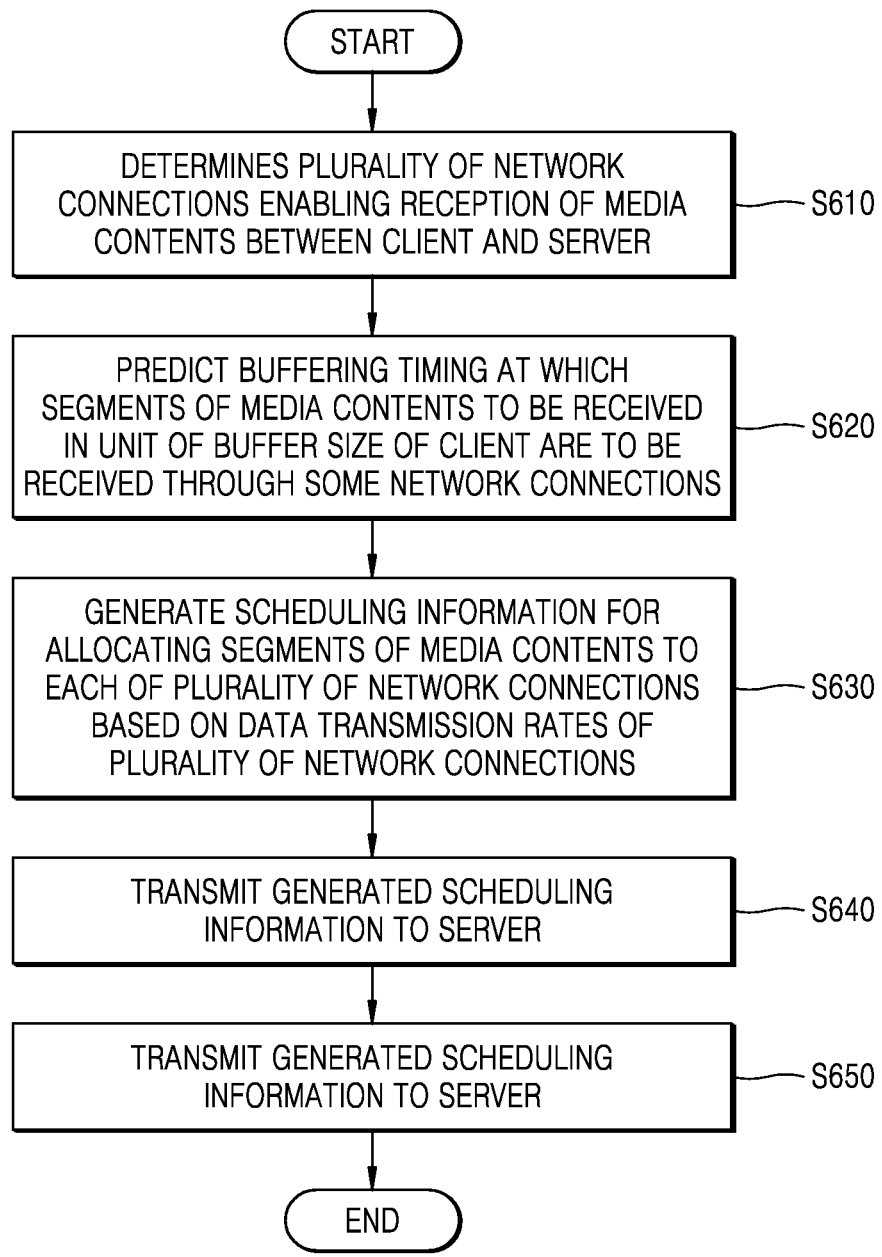
FIG. 6 is a flowchart illustrating a method of receiving media contents from a server at a client based on generated scheduling information, according to an embodiment.

FIG. 6 is a flowchart illustrating a method of receiving media contents from the server 200 at the client 100 based on generated scheduling information, according to an embodiment.

In operation S610, the client 100 determines the plurality of network connections 50 enabling the reception of the media contents between the client 100 and the server 200. The client 100 according to an embodiment obtains information about the number of determined plural network connections 50. Operation S610 may correspond to operation S310 of FIG. 3.

In operation S620, the client 100 predicts a buffering timing at which segments to be received in the unit of the buffer size of the client 100 are to be received through some of the determined plural network connections 50. Operation S620 may correspond to operation S320 of FIG. 3.

In operation S630, the client 100 generates scheduling information for allocating the remaining segments to be allocated to some network connections to each of the plurality of network connections 50 based on data transmission rates of the plurality of network connections at the predicted buffering timing. Herein, the scheduling information may include segment size information for allocating the remaining segments to be allocated to some network connections to each of the plurality of network connections 50.

The client 100 according to an embodiment may determine the number of network connections allocated to each segment based on Equation (1) and Equation (2), if a difference between the data transmission rates of the plurality of network connections 50 is less than a preset value. Sub segments generated as a result of changing the segment size based on the determined number of network connections are allocated to each of the plurality of network connections 50.

If the data transmission rate difference between the plurality of network connections 50 is greater than or equal to a preset value, the client 100 generates the scheduling information based on a ratio between data transmission rates of the plurality of network connections. If the data transmission rate difference between the plurality of network connections 50 is greater than or equal to the preset value, the scheduling information for allocating the segments to each of the plurality of network connections 50 may be generated based on Equations (4) through (6).

$$H = \sum_{i=1}^{N} \left[\frac{V_i}{V_{min}}\right] \quad \text{Equation 4}$$

$$A = \left[\frac{S}{H}\right], \quad R = S - A \times H \quad \text{Equation 5}$$

$$D = \left[\frac{H}{R}\right], \quad F_i = \frac{R}{D} \times \left[\frac{V_i}{V_{min}}\right] \quad \text{Equation 6}$$

In Equation (4), $V_i$ indicates a data transmission rate of an $i^{th}$ network connection and $V_{min}$ indicates a minimum data transmission rate among the plurality of network connections 50. H indicates the number of virtual network connections determined based on the minimum data transmission rate among the plurality of network connections 50.

Referring to Equation (5), S indicates the buffer size of the client 100, and A indicates a value obtained by reducing one unit time from a unit time needed for transmission of all segments to the buffer of the client 100 using the virtual network connections. Herein, one unit time refers to a time needed to transmit a segment of a preset size from the server 200 to the client 100 through a network connection. R indicates the number of remaining segments the client 100 has to receive to switch from the buffering mode to the play mode after the elapse of a unit time A.

Referring to Equation (6), D indicates the number of virtual network connections allocated to each remaining segment to receive R remaining segments during an identical unit time. Pi indicates a size of a sub-segment allocated to the network connection to download the R remaining segments during the identical unit time.

In operation S640, the client 100 transmits the generated scheduling information to the server 200. If it is determined that generation of the scheduling information has the effect, of shortening the time needed to receive the segments, the client 100 according to an embodiment transmits the generated scheduling information to the server 200. Operation S640 may correspond to operation S350 of FIG. 3.

In operation S650, the client 100 receives the media contents, based on the transmitted scheduling information.

The server 200 generates sub-segments by changing the size of remaining segments based on the scheduling information received from the client 100. Herein, the scheduling information may include information about the number of network connections allocated to each segment to receive the R segments in each of the plurality of network connections. The server 200 generates sub-segments by dividing a segment having a preset size by the number of network connections to be allocated.

The client 100 receives the sub-segments generated as a result of changing the preset size of the segments in the server 200 based on the scheduling information.

Figure 7:
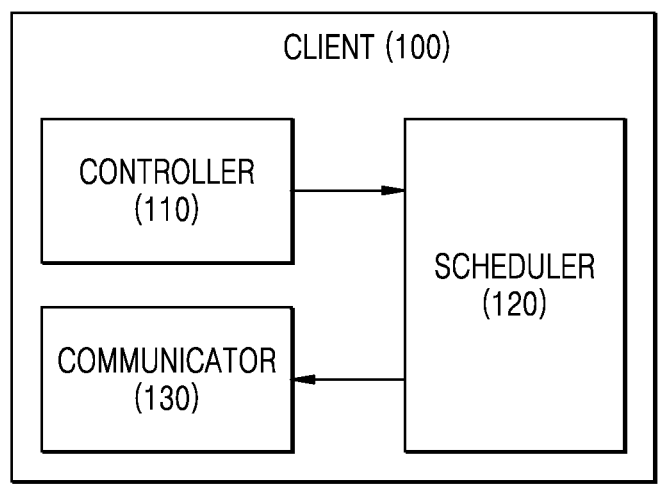
FIG. 7 is a block diagram of a client for scheduling reception of media contents, according to an embodiment.

FIG. 7 is a block diagram of the client 100 for scheduling reception of media contents, according to an embodiment. Referring to FIG. 7, the client 100 for scheduling reception of media contents may include a controller 110, a scheduler 120, and a communicator 130.

The client 100 for scheduling reception of the media contents, which is illustrated in FIG. 7, includes elements associated with the current embodiment. Thus, it would be understood by those of ordinary skill in the art that general-purpose elements other than the elements illustrated in FIG. 7 may also be included in the client 100.

The controller 110 controls an overall operation of the client 100 for scheduling reception of media contents. For example, the controller 110 may control the scheduler 120 and the communicator 130 overall by executing programs stored in a memory (not shown).

The controller 110 determines the plurality of network connections 50 enabling the reception of the media contents between the client 100 and the server 200. The controller 110 monitors a status of a network established between the client 100 and the server 200 to determine the plurality of network connections 50 connecting the client 100 with the server 200. The controller 110 obtains information about the number of determined plural network connections 50.

The controller 110 predicts an effect corresponding to the scheduling information generated by the scheduler 120. The controller 110 determines whether a difference between a first reception time, in which the segments are received through some network connections and a second reception time, in which the segments are received through the plurality of network connections 50 based on the generated scheduling information exceeds a threshold value. For example, if the difference between the first reception time and the second reception time exceeds the threshold value, the controller 110 may determine that generation of the scheduling information has the effect of shortening a time needed to receive the segments.

The scheduler 120 predicts a buffering timing at which segments received in the unit of the buffer size of the client 100 are received through some of the determined plural network connections 50.

The scheduler 120 generates scheduling information for allocating the remaining segments to be allocated to some network connections to each of the plurality of network connections at the predicted buffering timing. The scheduler 120 determines the number of network connections allocated to one remaining segment to allocate segments to be allocated to some network connections to each of the plurality of network connections, based on the number of plural network connections 50 and the buffer size of the client 100.

The scheduler 120 may extract scheduling information corresponding to the number of plural network connections 50 and the buffer size of the client 100 from a previously stored lookup table, without a separate operation.

According to an embodiment, the previously stored lookup table may include information about the scheduling effect corresponding to the number of plural network connections 50 and the buffer size of the client 100. The controller 110 according to an embodiment may determine whether the scheduling effect exists, by extracting scheduling effect information corresponding to the buffer size and the number of plural network connections 50 from the lookup table, without needing to perform an operation for determining whether the scheduling effect exists.

The communicator 130 transmits the generated scheduling information to the server 200. The server 200 according to an embodiment changes the preset size of the remaining segments based on the scheduling information received from the client 100. The server 200 allocates generated sub-segments of the media contents generated as a result of changing the size of the segments based on the scheduling information to each of the plurality of network connections. The communicator 130 receives the sub-segments allocated to each of the plurality of network connections.

Figure 8:
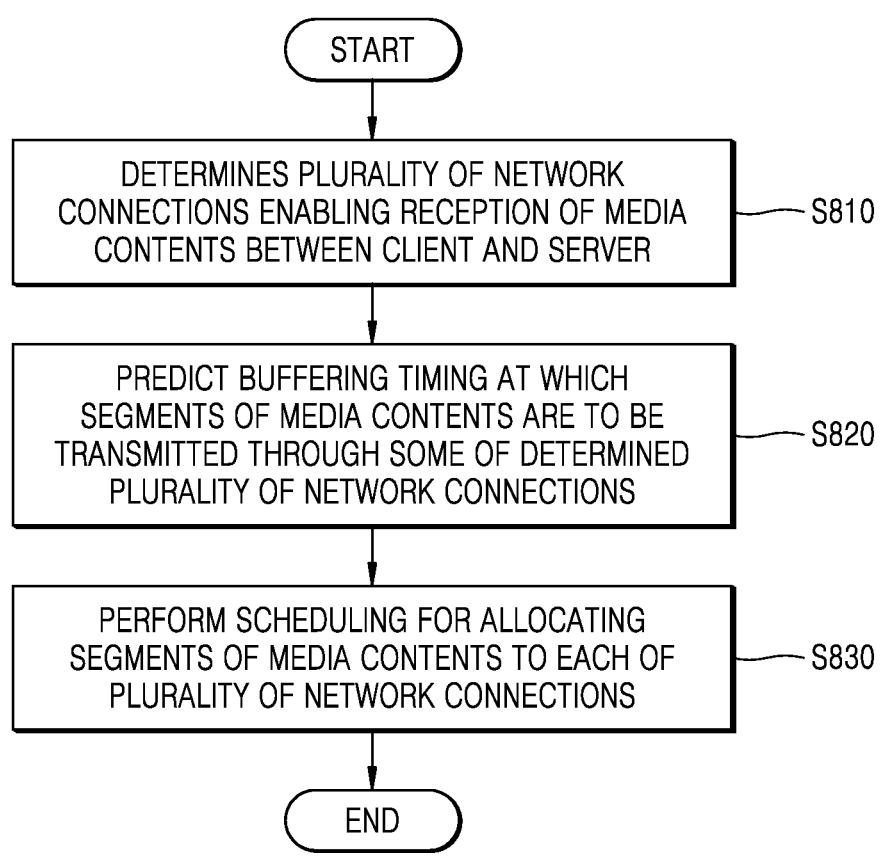
FIG. 8 is a flowchart for describing a method of scheduling transmission of media contents at a server, according to another embodiment.

FIG. 8 is a flowchart for describing a method of scheduling transmission of media contents at the server 200, according to another embodiment.

In operation S810, the server 200 determines the plurality of network connections 50 enabling the reception of the media contents between the client 100 and the server 200. The server 200 monitors a status of a network established between the client 100 and the server 200 to determine the plurality of network connections 50 connecting the client 100 with the server 200. The server 200 obtains information about the number of determined plural network connections 50.

In operation S820, the server 200 predicts a buffering timing at which segments to be transmitted in the unit of the buffer size of the client 100 are to be transmitted through some of the determined plural network connections 50. The server 200 according to an embodiment obtains buffer size information of the client 100. When the server 200 transmits the segments to the client 100 through streaming, the server 200 transmits segments corresponding to the buffer size of the client 100. The server 200 may determine the number of segments transmitted to the client 100 based on the obtained buffer size information of the client 100.

The server 200 determines, based on the determined number of plural network connections 50 and the segment size information of the segments to transmitted, whether the segments are to be transmitted through some of the plural network connections 50. A detailed method of determining whether the segments are to be transmitted through some of the plural network connections 50 has been described with reference to FIG. 4 and Equations (1) and (2).

In operation S830, the server 200 performs scheduling to allocate the segments to be allocated to some network connections to each of the plurality of network connections at the predicted buffed ng timing. The server 200 obtains the number R of remaining segments by using Equation (1) based on the buffer size and the number of plural network connections 50. The server 200 calculates the number of network connections allocated to each remaining segment based on Equation (2).

The server 200 changes the size of the remaining segment to allocate one remaining segment to each of the calculated number of network connections. For example, if the number of network connections calculated for one remaining segment is 2, the server 200 may generate a sub-segment having a size that is half the size of the remaining segment.

The server 200 according to an embodiment allocates a plurality of sub-segments generated as a result of dividing the remaining segment to each of the plurality of network connections 50. The server 200 divides the remaining segments and allocates them to each of the plurality of network connections 50, thereby shortening a time needed to transmit the media contents to the client 100.

Figure 9:
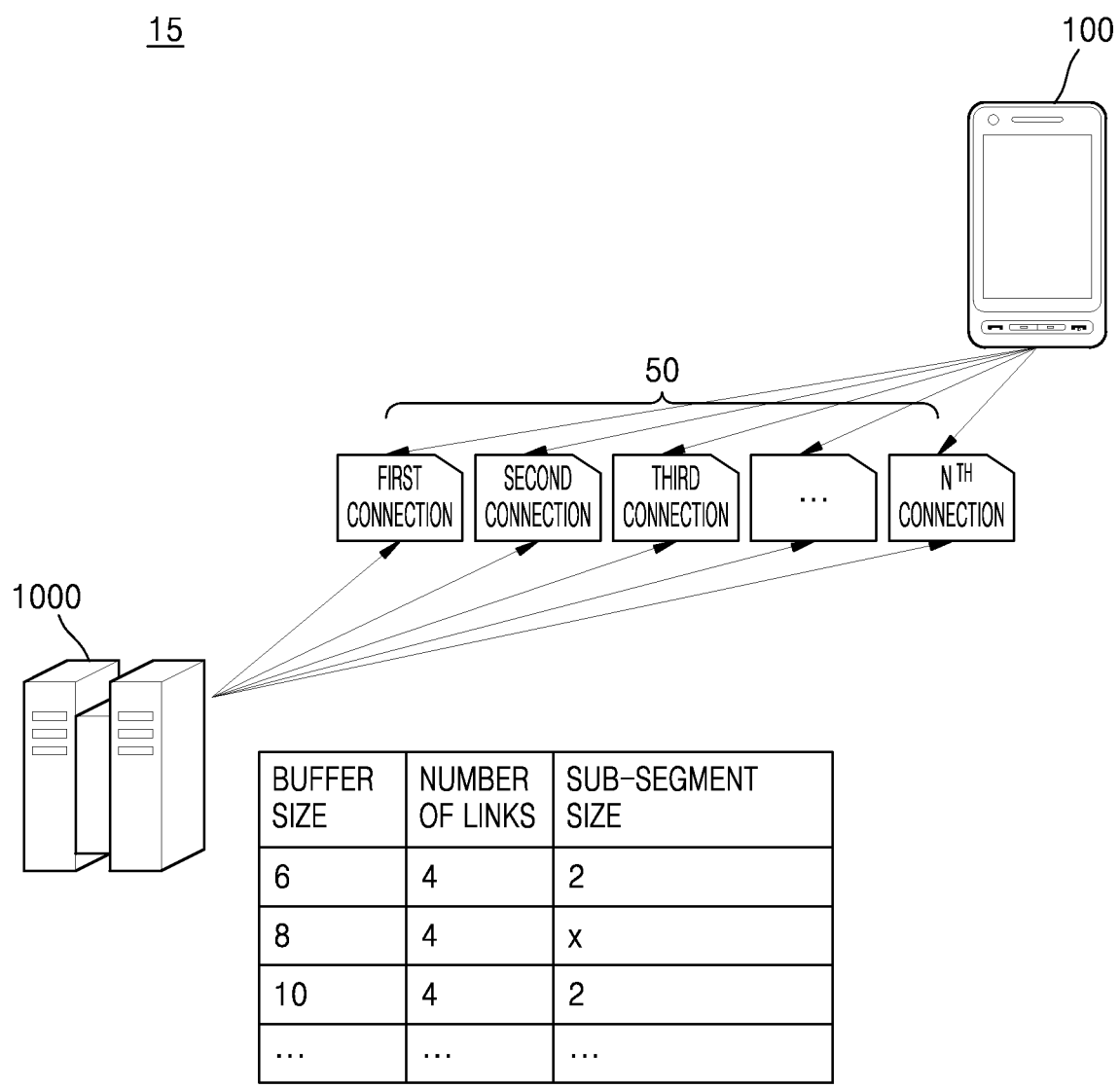
FIG. 9 is a view for describing a method of scheduling transmission of media contents by using a lookup table at a server, according to an embodiment.

FIG. 9 is a view for describing a method of scheduling transmission of media contents by using a lookup table at the server 200, according to an embodiment.

The server 200 may generate scheduling information from a lookup table which defines a relationship between the number of plural network connections 50 and the buffer size of the client 100, and a size of segments allocated to each of the plurality of network connections 50.

For example, the server 200 may determine the number N of plural network connections 50 with the client 100 by monitoring a network state and obtain the buffer size S of the client 100. The server 200 extracts segment size information for allocating segments to each of the plurality of network connections 50 from the lookup table when the number of network connections 50 is N and the buffer size is S. The server 200 may shorten a time needed to generate the scheduling information by extracting the segment size information from the lookup table.

According to another embodiment, the lookup table may include scheduling effect information. If the client 100 performs scheduling and transmits segments to the client 100, the server 200 may determine whether the transmission time is shortened. If it is determined that the scheduling effect does not exist, the server 200 according to an embodiment transmits the segments to the client 100 without performing scheduling. The lookup table may include information about whether the scheduling effect exists when the number of plural network connections 50 is N and the buffer size is S. In this case, based on the information about existence of the scheduling effect extracted from the lookup table, the server 200 may schedule the segments and determine whether to transmit the segments to the client 100, without needing a separate operation.

Figure 10:
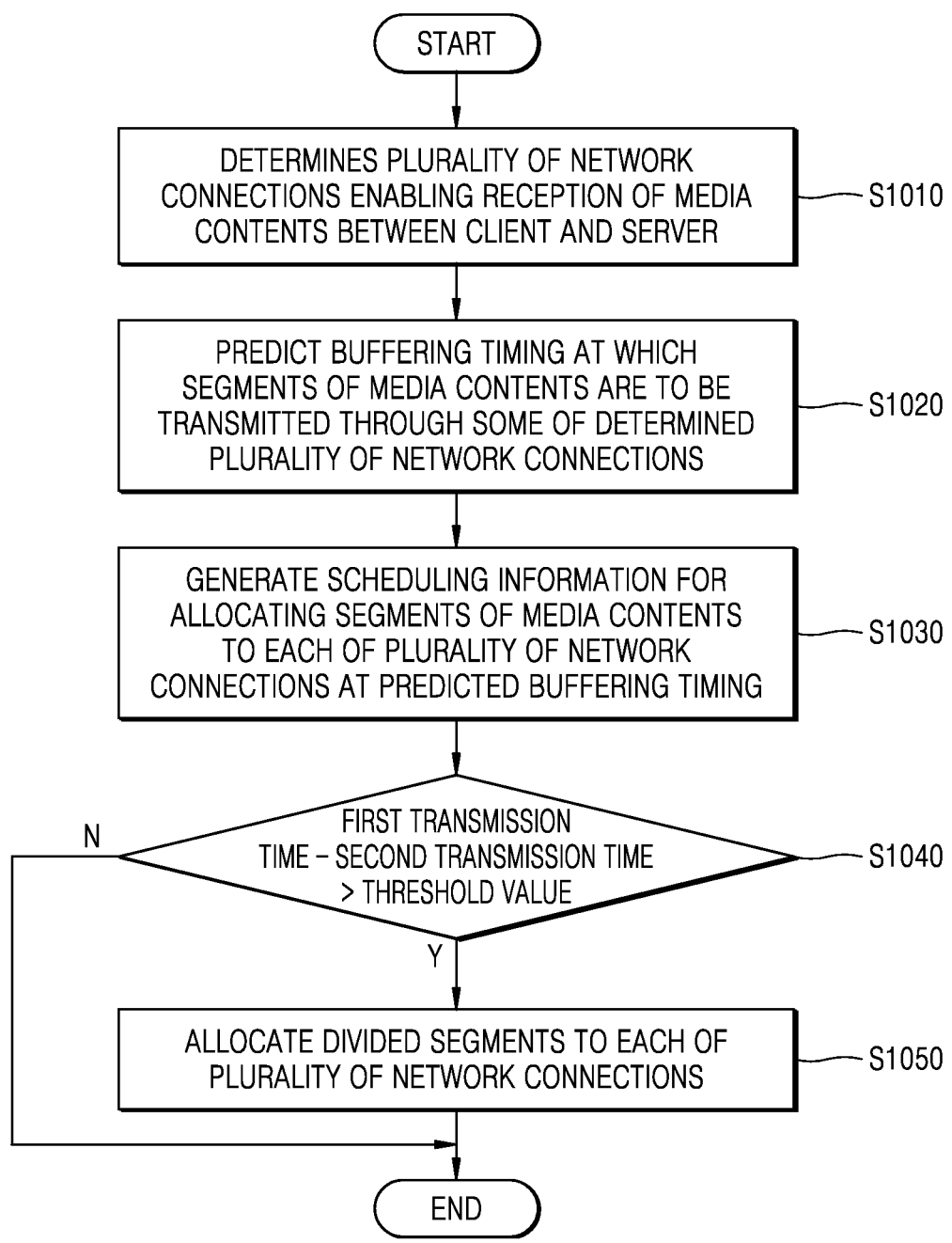
FIG. 10 is a flowchart illustrating a method of determining whether a scheduling effect exists and performing scheduling, based on a determination result, at a server, according to an embodiment.

With reference to FIG. 10, a detailed description will be given of a method of determining, by the server 200, whether the scheduling effect exists, without using the lookup table.

FIG. 10 is a flowchart illustrating a method of determining whether a scheduling effect exists and performing scheduling based on a determination result at the server 200, according to an embodiment.

In operation S1010, the server 200 determines the plurality of network connections 50 enabling the reception of the media contents between the client 100 and the server 200. The server 200 monitors a status of a network established between the client 100 and the server 200 to obtain the determined number of plural network connections 50. Operation S1010 may correspond to operation S810.

In operation S1020, the server 200 predicts a buffering timing at which segments to be transmitted in the unit of the buffer size of the client 100 are to be transmitted through some of the determined plural network connections 50. Operation S1020 may correspond to operation S820.

In operation S1030, the server 200 generates scheduling information for allocating the remaining segments to be allocated to some network connections to each of the plurality of network connections at the predicted buffering timing. The scheduling information may include information about the number of network connections to be allocated to one remaining segment to allocate the remaining segments to each of the plurality of network connections. The information about the number of network connections to be allocated to one remaining segment may be calculated based on Equations (1) and (2) described with reference to FIG. 4, the number of plural network connections 50, and the buffer size of the client 100.

In operation S1040, the server 200 determines whether a difference between a first transmission time in which the segments are transmitted through some network connections and a second transmission time in which the segments are transmitted through the plurality of network connections 50 based on the generated scheduling information exceeds a threshold value.

If the difference between the first transmission time and the second transmission time exceeds the threshold value, the server 200 may determine that the scheduling has the effect of shortening the buffering time. Whether the difference between the first transmission time and the second transmission time exceeds the threshold value may be determined based on Equation (3).

In operation S1050, the server 200 allocates the divided segments to each of the plurality of network connections 50. If the difference between the first transmission time and the second transmission time exceeds a threshold value, the server 200 divides the remaining segments based on the number of network connections to be allocated to one remaining segment, which is included in the scheduling information. The server 200 allocates the divided segments to each of the plurality of network connections 50 and transmits the segments to the client 100.

Figure 11:
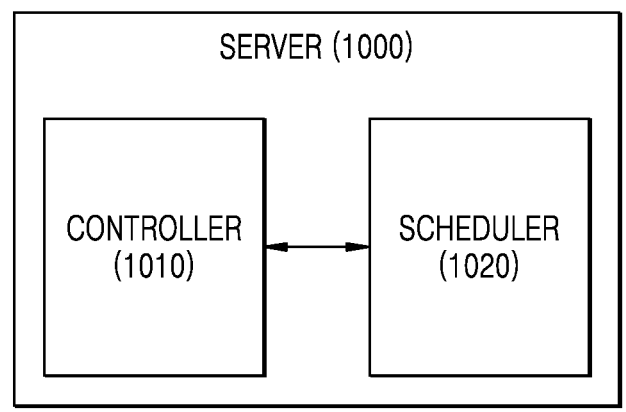
FIG. 11 is a block diagram of a server for scheduling transmission of media contents, according to an embodiment.

FIG. 11 is a block diagram of the server 200 for scheduling transmission of media contents according to an embodiment.

The controller 1010 determines the plurality of network connections 50 enabling the reception of the media contents between the client 200 and the server 100. The controller 1010 monitors a status of a network established between the client 100 and the server 200 to determine the plurality of network connections 50 connecting the client 100 with the server 200. The controller 1010 obtains information about the number of determined plural network connections 50.

The scheduler 1020 predicts a buffering timing at which segments transmitted in the unit of the buffer size of the client 100 are transmitted through some of the determined plural network connections 50. The scheduler 1020 according to an embodiment obtains buffer size information of the client 100. When the server 200 transmits the segments to the client 100 through streaming, the server 200 transmits segments corresponding to the buffer size of the client 100. The scheduler 1020 may determine the number of segments transmitted to the client 100 based on the obtained buffer size information of the client 100.

The scheduler 1020 determines based on the determined number of plural network connections 50 and the segment size information of the segments to be transmitted, whether the segments are to be transmitted through some of the plural network connections 50.

The scheduler 1020 performs scheduling to allocate the segments to be allocated to some network connections to each of the plurality of network connections at the predicted buffering timing. The scheduler 1020 obtains the number R of remaining segments by using Equation (1) based on the buffer size and the number of plural network connections 50.

The scheduler 1020 changes the size of the remaining segment to allocate one remaining segment to each of the calculated number of network connections. For example, if the number of network connections calculated for one remaining segment is 2, the scheduler 1020 may generate a sub-segment having a size that is half the size of the remaining segment.

The scheduler 100 allocates a plurality of sub-segments generated as a result of dividing the remaining segment to each of the plurality of network connections 50.

Figure 12:
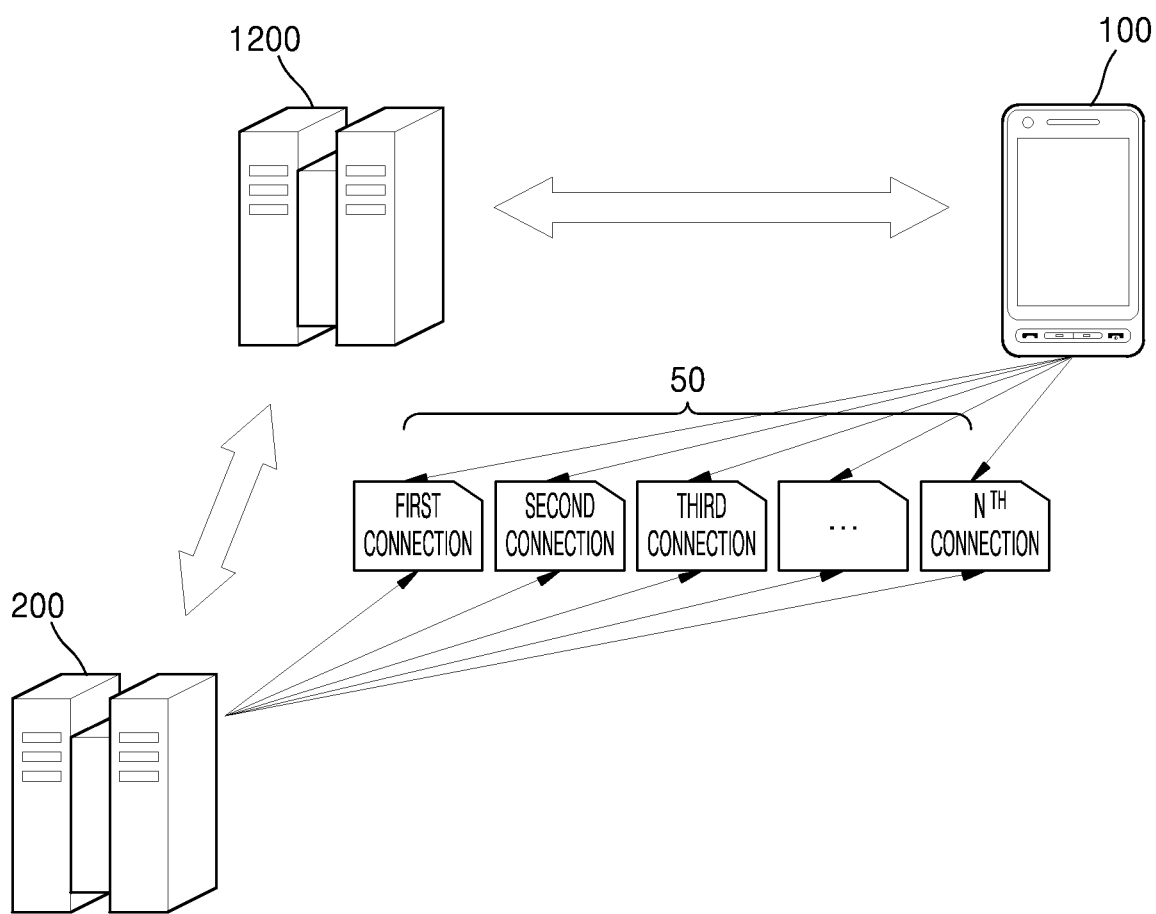
FIG. 12 is a conceptual view for describing a system for scheduling transmission and reception of media contents, according to another embodiment.

FIG. 12 is a conceptual view for describing a system 20 for scheduling transmission and reception of media contents according to another embodiment. Referring to FIG. 12, the system 20 (hereinafter, referred to as 'scheduling system') for scheduling transmission and reception of media contents may include a client device 100, a first server 200 (corresponding to the server 200 of FIG. 1), and a second server 1200.

The scheduling system 20 illustrated in FIG. 12 includes elements associated with the current embodiment. Thus, it would be understood by those of ordinary skill in the art that general-purpose elements other than the elements illustrated in FIG. 12 may also be included in the scheduling system 10.

According to an embodiment, the client 100 transmits data to and receives data from the first server 200 and the second server 1200. For example, the client 100 may transmit media contents to and receive media contents from the first server 200. The client 100 transmits information needed for transmission and reception of media contents to the second server 1200. For example, the client 100 may transmit information about the buffer size of the client 100 to the second server 1200.

The client 100 receives media contents from the first server 200 through a plurality of network connections 50 in a streaming manner. The client 100 may include a buffer capable of storing media contents to receive the media contents from the first server 200 in the streaming manner.

The client 100 may be implemented in various forms. For example, the client 100 described herein may be, hut not limited to, a cellular phone, a smartphone, a laptop computer, a tablet personal computer (PC), or the like.

The first server 200 according to an embodiment transmits media contents to the client 100. The first server 200 transmits media contents stored inside or outside the first server 200 to the client 100 through the plurality of network connections 50 between the first server 200 and the client 100.

For example, the first server 200 may communicate with the second server 1200. The first server 200 may determine the size of a segment that is the transmission unit of the media contents, based on the scheduling information received from the second server 1200. This will be described in detail with reference to FIG. 13.

The second server 1200 according to an embodiment may communicate with the client 100 and the first server 200. For example, the second server 1200 may obtain information about the buffer size of the client 100 from the client 100. The second server 1200 may obtain, from the client 100 or the first server 200, information about the number of plural network connections 50 enabling the reception and transmission of the media contents between the client 100 and the first server 200.

The second server 1200 may generate scheduling information based on the obtained buffer size of the client 100 and the obtained number of plural network connections 50, so that segments to be transmitted from the first server 200 to the client 100 are allocated to each of the plurality of network connections 50. A method of generating the scheduling information at the second server 1200 will be described in detail with reference to FIG. 13.

The second server 1200 transmits the generated scheduling information to the first server 200. The first server 200 allocates the segments to each of the plurality of network connections 50 based on the scheduling information received from the second server 1200.

Figure 13:
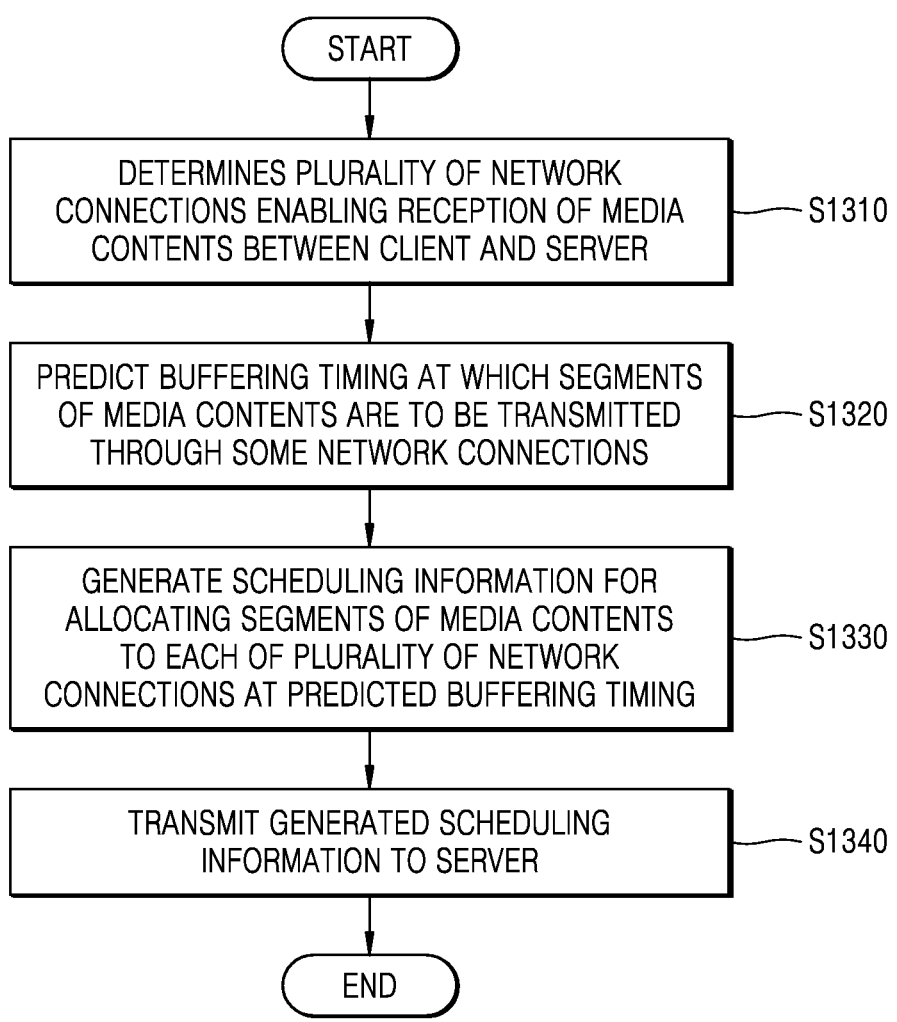
FIG. 13 is a flowchart illustrating a method of generating scheduling information for receiving media contents at a second server, according to an embodiment.

FIG. 13 is a flowchart illustrating a method of generating scheduling information for receiving media contents at the second server 1200 according to an embodiment.

In operation S1310, the second server 1200 determines the plurality of network connections 50 enabling the reception of the media contents between the client 100 and the first server 200. The second server 1200 monitors a state of the network established between the client 100 and the first server 200. The second server 1200 obtains information about the number of plural network connections 50 connecting the client 100 with the first server 200 as a result of the monitoring.

In operation S1320, the second server 1200 predicts a buffering timing at which segments to be transmitted in the unit of the buffer size of the client 100 are to be transmitted through some of the determined plural network connections 50. The second server 1200 according to an embodiment obtains information about the size of segments to be transmitted to the client 100 from the first server 200 based on the obtained buffer size of the client 100. For example, to transmit data to the client 100, the first server 200 may transmit segments corresponding to the buffer size through streaming. Thus, the segments corresponding to the buffer size of the client 100 may be transmitted from the first server 200 to the client 100.

The second server 1200 determines based on the determined number of plural network connections 50 and the segment size information of the segments to be transmitted, whether the segments are to be transmitted through some of the plural network connections 50. A detailed method of determining whether the segments are to be transmitted through some of the plural network connections 50 by the first server 200 may refer to FIG. 4 and Equations (1) and (2).

In operation S1330, the second server 1200 generates scheduling information for allocating the remaining segments to be allocated to some network connections to each of the plurality of network connections 50 at the predicted buffering timing. The second server 1200 obtains the number R of remaining segments by using Equation (1) based on the buffer size and the number of plural network connections 50.

The second server 1200 generates scheduling information for changing the size of the remaining segment to allocate one remaining segment to each of the calculated number of network connections. A method of generating the scheduling information by the second server 1200 in operation S1330 may correspond to a method of generating the scheduling information by the client 100 in operation S330 of FIG. 2.

In operation S1340, the second server 1200 transmits the generated scheduling information to the server 200. The server 200 generates sub-segments by changing the size of the segments based on the scheduling information received from the second server 1200 to allocate the segments to each of the plurality of network connections 50. For example, if the number of network connections calculated for a segment is 2, the second server 1200 may divide the remaining segment into sub-segments having a size that is half the size of the remaining segment.

The first server 200 according to an embodiment allocates a plurality of sub-segments generated as a result of dividing the remaining segment to each of the plurality of network connections 50. The first server 200 divides the remaining segments and allocates them to each of the plurality of network connections 50, thereby shortening a time needed to transmit the media contents to the client 100.

Figure 14:
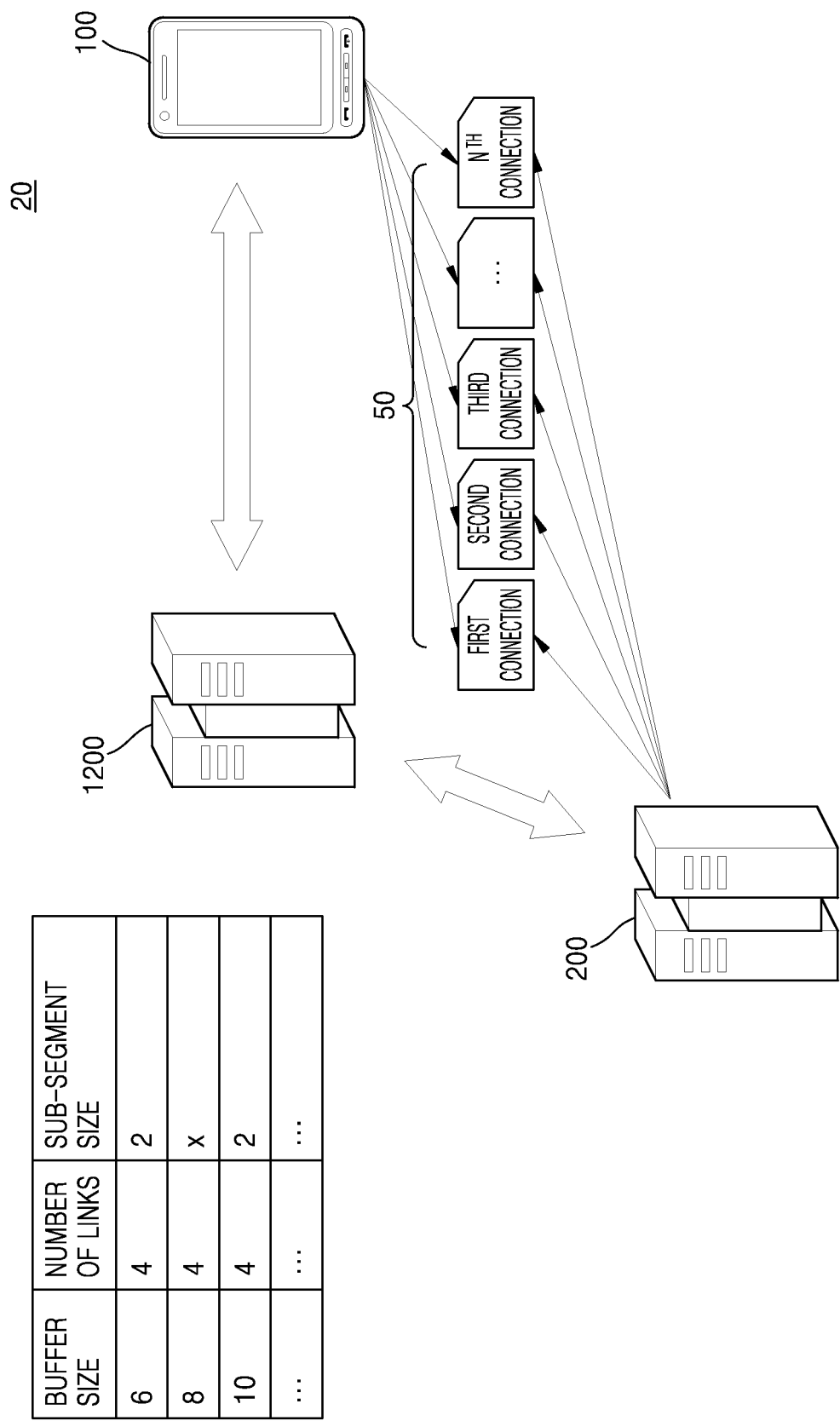
FIG. 14 is a view for describing a method of scheduling transmission and reception of media contents by using a lookup table at a second server, according to an embodiment.

FIG. 14 is a view for describing a method of scheduling transmission and reception of media contents by using a lookup table at the second server 1200 according to an embodiment.

The second server 1200 may generate scheduling information from a lookup table which defines a relationship between the number of plural network connections 50 and the buffer size of the client 100, and a size of segments allocated to each of the plurality of network connections 50.

For example, the second server 1200 may determine the number N of plural network connections 50 enabling the reception and transmission of the media contents between the client 100 and the first server 200 by monitoring a network state, and obtain the buffer size S of the client 100. The second server 1200 extracts segment size information for allocating segments to each of the plurality of network connections 50 from the lookup table when the number of network connections 50 is N and the buffer size is S. The second server 1200 may shorten a time needed to generate the scheduling information by extracting the segment size information from the lookup table.

According to another embodiment, the lookup table may include scheduling effect information. If the second server 1200 performs scheduling and transmits segments to the client 100, the second server 1200 may determine whether the transmission time is shortened. If it is determined that the scheduling effect does not exist, the second server 1200 according to an embodiment transmits the segments to the client 100 without performing scheduling. The lookup table may include information about whether the scheduling effect exists when the number of plural network connections 50 is N and the buffer size is S. In this case, based on the information about existence of the scheduling effect extracted from the lookup table, the second server 1200 may generate scheduling information without a separate operation.

Figure 15:
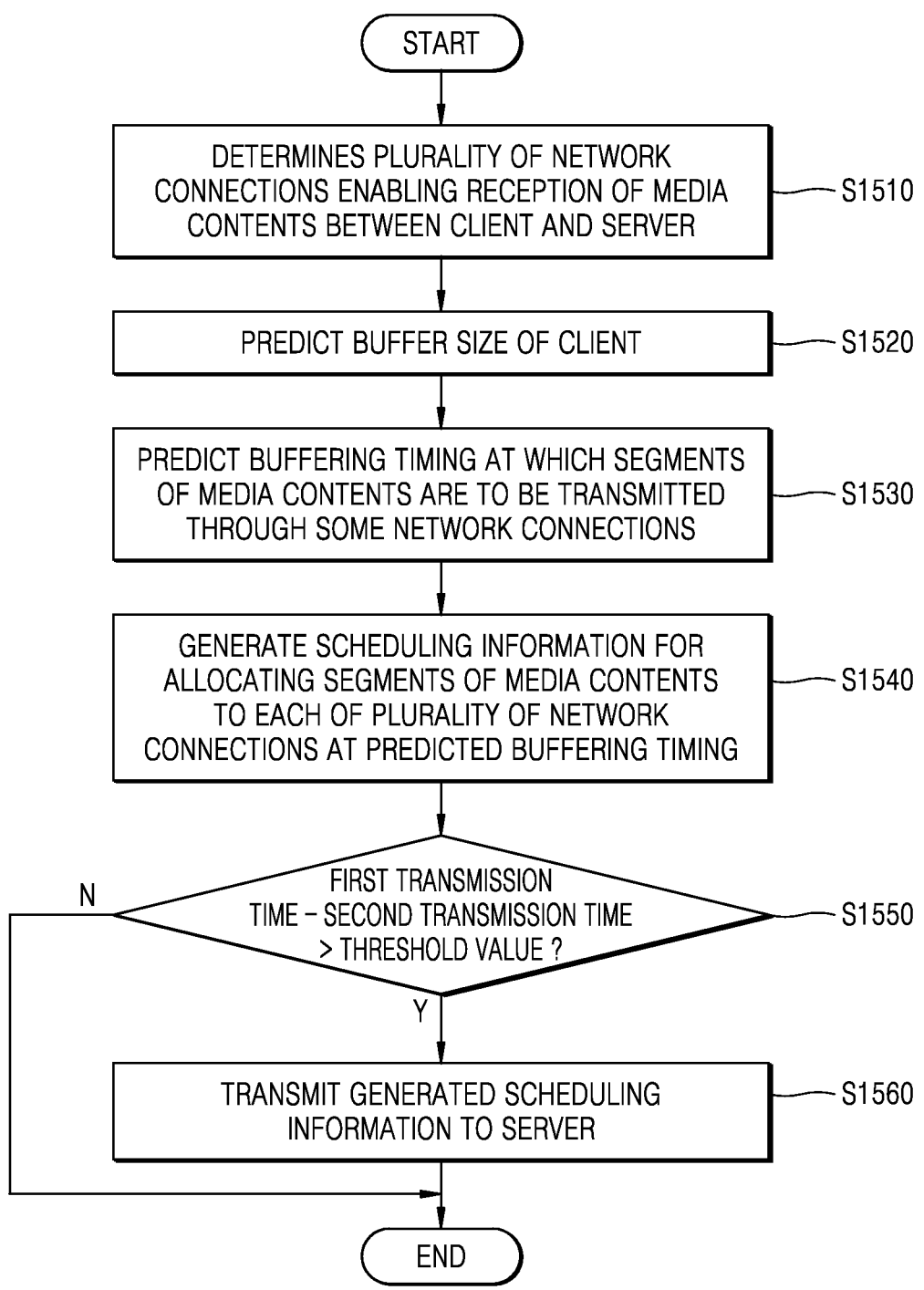
FIG. 15 is a flowchart illustrating a method of determining whether a scheduling effect exists, if scheduling transmission and reception of media contents is performed, at a second server, according to an embodiment of the present disclosure.

With reference to FIG. 15, a detailed description will be made of a method of determining whether the scheduling effect exists by the second server 1200 without using the lookup table.

FIG. 15 is a flowchart illustrating a method of determining whether a scheduling effect exists, if scheduling transmission and reception of media contents, at the second server 1200 according to an embodiment of the present disclosure.

In operation S1510, the second server 1200 determines the plurality of network connections 50 enabling the reception of the media contents between the client 100 and the server 200. The second server 1200 monitors a status of a network established between the client 100 and the server 200 to obtain the determined number of plural network connections 50. Operation S1510 may correspond to operation S1310.

In operation S1520, the second server 1200 predicts a buffering timing at which segments to be transmitted in the unit of the buffer size of the client 100 are to be transmitted through some of the determined plural network connections 50. Operation S1020 may correspond to operation S820.

In operation S1530, the second server 1200 generates scheduling information for allocating the remaining segments to be allocated to some network connections to each of the plurality of network connections at the predicted buffering timing. The scheduling information may include information about the number of network connections to be allocated to one remaining segment to allocate the remaining segments to each of the plurality of network connections. The information about the number of network connections to be allocated to one remaining segment may be calculated based on Equations (1) and (2) described with reference to FIG. 4, the number of plural network connections 50, and the buffer size of the client 100.

In operation S1540, the second server 1200 determines whether a difference between a first transmission time in which the segments are transmitted through some network connections and a second transmission time in which the segments are transmitted through the plurality of network connections 50 based on the generated scheduling information exceeds a threshold value.

If the difference between the first transmission time and the second transmission time exceeds the threshold value, the second server 1200 may determine that the scheduling has the effect of shortening the buffering time. Whether the difference between the first transmission time and the second transmission time exceeds the threshold value may be determined based on Equation (3).

In operation S1550, the second server 1200 transmits the generated scheduling information to the first server 200. If the difference between the first transmission time and the second transmission time exceeds the threshold value, the first server 1200 transmits the scheduling information to the first server 200. The first server 200 allocates the divided segments to each of the plurality of network connections 50 and transmits the segments to the client 100.

Figure 16:
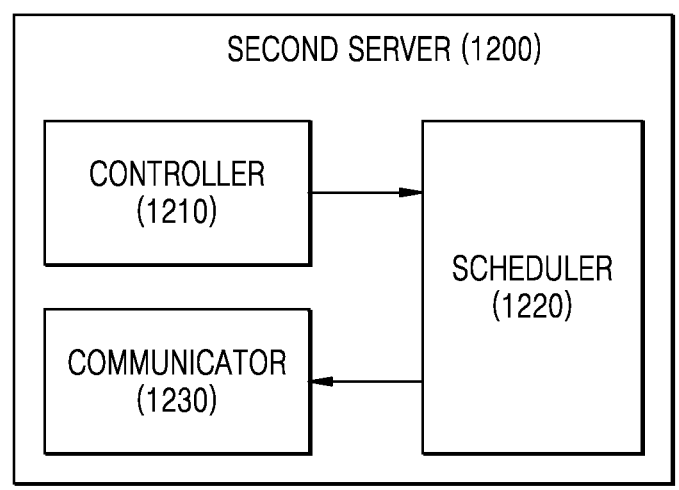
FIG. 16 is a block diagram of a second server for scheduling transmission and reception of media contents, according to an embodiment.

FIG. 16 is a block diagram of the second server 1200 for scheduling transmission and reception of media contents according to an embodiment. Referring to FIG. 16, the second server 1200 for scheduling reception of media contents may include a controller 1210, a scheduler 1230, and a communicator 1230.

The second server 1200 for scheduling transmission and reception of the media contents, which is illustrated in FIG. 16, includes elements associated with the current embodiment. Thus, it would be understood by those of ordinary skill in the art that general-purpose elements other than the elements illustrated in FIG. 16 may also be included in the client 100.

The controller 1210 controls an overall operation of the client 100 for scheduling reception of media contents. For example, the controller 1210 may control the scheduler 1220 and the communicator 1230 overall by executing programs stored in a memory (not shown).

The controller 1210 determines the plurality of network connections 50 enabling the reception of the media contents between the client 100 and the first server 200. The controller 1210 monitors a status of a network established between the client 100 and the server 200 to determine the plurality of network connections 50 connecting the client 100 with the server 200. The controller 1210 obtains information about the number of determined plural network connections 50.

The controller 1210 predicts an effect corresponding to the scheduling information generated by the scheduler 1220. The controller 1210 determines whether a difference between a first reception time, in which the segments of the media contents are received through some network connections and a second reception time, in which the segments of the media contents are received through the plurality of network connections 50 based on the generated scheduling information exceeds a threshold value. For example, if the difference between the first reception time and the second reception time exceeds the threshold value, the controller 1210 may determine that generation of the scheduling information has the effect of shortening a time needed to receive the segments of the media contents.

The scheduler 1220 predicts a buffering timing at which segments of the media contents received in the unit of the buffer size of the client 100 are received through some of the determined plural network connections 50.

The scheduler 2120 generates scheduling information for al locating the segments of the media contents to be allocated to some network connections to each of the plurality of network connections at the predicted buffering timing. The scheduler 1220 determines the number of network connections allocated to one segment of the media contents to allocate segments of the media contents to be allocated to some network connections to each of the plurality of network connections, based on the number of plural network connections 50 and the buffer size of the client 100.

The scheduler 1220 may extract scheduling information corresponding to the number of plural network connections 50 and the buffer size of the client 100 from a previously stored lookup table, without a separate operation.

The communicator 1230 transmits the generated scheduling information to the first server 200. The first server 200 according to an embodiment changes the preset size of the segments of the media contents, based on the scheduling information received from the communicator 1230. The first server 200 transmits sub-segments generated as a result of changing the size of the segments to the client 100 through each of the plurality of network connections 50.

An apparatus according to the present disclosure may be a processor, a memory for storing program data and executing it, a permanent storage such as a disk drive, a communications port for communicating with external devices, and user interface devices, such as a touch panel, a key, a button, etc. Methods implemented with a software module or algorithm may be stored as computer-readable codes or program instructions executable on the processor on non-transitory computer-readable recording media. Examples of the non-transitory computer-readable recording media may include a magnetic storage medium (e.g., read-only memory (ROM), random-access memory (RAM), floppy disk, hard disk, etc. and an optical medium (e.g., a compact disc-ROM (CD-ROM), a digital versatile disc (DVD), etc.), and so forth. The non-transitory computer-readable recording medium may be distributed over network coupled computer systems on that computer-readable code may be stored and executed in a distributed fashion. The non-transitory medium may be read by a computer, stored in a memory, and executed by a processor.

All documents cited in the above description, including published documents, patent applications, and patents, may be incorporated herein in their entirety by reference in the same manner as when each cited document is separately and specifically incorporated or incorporated in its entirety.

Reference numerals have been used in exempla embodiments illustrated in the attached drawings to help understanding of the present disclosure, and particular terms have been used to describe the embodiments of the present disclosure, but the present disclosure is not limited to the particular terms, and the present disclosure may include any element that may be generally conceived by those of ordinary skill in the art.

The present disclosure may be represented by block components and various process operations. Such functional blocks may be implemented by various numbers of hardware and/or software components which perform specific functions. For example, the present disclosure may employ various integrated circuit components, e.g., memory elements, processing elements, logic elements, look-up tables, and the like, which may carry out a variety of functions under the control of one or more microprocessors or other control devices. Similarly, where the elements of the present disclosure are implemented using software programming or software elements the disclosure may be implemented with any programming or scripting language such as C, C++, Java, assembler, or the like, with the various algorithms being implemented with any combination of data structures, objects, processes, routines or other programming elements. Functional aspects may be implemented as an algorithm executed in one or more processors. Furthermore, the present disclosure may employ any number of conventional techniques for electronics configuration, signal processing and/or control, data processing and the like. The term "mechanism", "element", "means", or "component" is used broadly and is not limited to mechanical or physical embodiments. The term may include a series of routines of software in conjunction with the processor or the like.

The particular implementations shown and described herein are illustrative examples of the present disclosure and are not intended to otherwise limit the scope of the present disclosure in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. Moreover, no item or component is essential to the practice of the present disclosure unless the element is specifically described as "essential" or "critical".

In the present disclosure (especially, in the claims), the use of "the" and other demonstratives similar thereto may correspond to both a singular form and a plural form. Also, if a range is described in the present disclosure, the range has to be regarded as including inventions adopting any individual element within the range (unless described otherwise), and each individual element included in the range has to be regarded as having been written in the detailed description of the disclosure. Unless the order of operations of a method according to the present disclosure is explicitly mentioned or described otherwise, the operations may be performed in a proper order. The order of the operations is not limited to the order the operations are mentioned. The use of all examples or exemplary terms (e.g., "etc.,", "and (or) the like", and "and so forth") is merely intended to describe the present disclosure in detail, and the scope is not necessarily limited by the examples or exemplary terms unless defined by the claims. Also, one of ordinary skill in the art may appreciate that the present disclosure may be configured through various modifications, combinations, and changes according to design conditions and factors without departing from the spirit and technical scope of the present disclosure and its equivalents.

The invention claimed is:

1. A method, performed by a client, of scheduling reception of media content, the method comprising:
    determining a plurality of network connections enabling reception of media content including a plurality of segments between the client and a server;
    predicting a scheduling time based on a buffer size of the client and a number of the plurality of network connections, wherein the scheduling time indicates a time at which at least one remaining segment is allocated to a part of the plurality of network connections, in response to a portion of the plurality of segments being received using each of the plurality of network connections;
    generating scheduling information for allocating the at least one remaining segment to each of the plurality of network connections in a unit of sub-segments at the scheduling time; and
    transmitting the generated scheduling information to the server.

2. The method of claim 1,
    wherein the generating of the scheduling information comprises comparing a first reception time, in which the at least one remaining segment of the media content is received through the part of the plurality of network connections, with a second reception time, in which the at least one remaining segment of the media content is received through the plurality of network connections, and
    wherein the transmitting of the generated scheduling information comprises transmitting the generated scheduling information based on a result of the comparing of the first reception time with the second reception time.

3. The method of claim 1, further comprising receiving the media content based on the scheduling information transmitted to the server.

4. The method of claim 3, wherein the receiving of the media content comprises receiving, from the server, the sub-segments generated by the server by dividing the at least one remaining segment of the media content based on the scheduling information transmitted to the server.

5. The method of claim 4, wherein the receiving of the sub-segments comprises determining a number of sub-segments to be allocated to each of the plurality of network connections based on a ratio of data transmission rates of the plurality of network connections, if the data transmission rates of the plurality of network connections are different from one another.

6. A method, performed by a server, of scheduling transmission of media content, the method comprising:
    determining a plurality of network connections enabling reception of media content including a plurality of segments between a client and the server;
    predicting a scheduling time based on scheduling information received from the client, the scheduling information being generated by the client based on a buffer size of the client and a number of the plurality of network connections, wherein the scheduling time indicates a time at which at least one remaining segment is allocated to a part of the plurality of network connections, in response to a portion of the plurality of segments being received using each of the plurality of network connections; and
    performing scheduling for allocating the at least one remaining segment to each of the plurality of network connections in a unit of sub-segments at the scheduling time.

7. The method of claim 6, wherein the performing of the scheduling comprises:

comparing a first reception time, in which the at least one remaining segment of the media content is received through the part of the plurality of network connections, with a second reception time, in which the at least one segment of the media content is received through the plurality of network connections; and performing the scheduling for allocating the at least one remaining segment of the media content to each of the plurality of network connections based on a result of the comparing of the first reception time with the second reception time.

8. A client for scheduling reception of media content, the client comprising:

a controller configured to:

determine a plurality of network connections enabling reception of media content including a plurality of segments between the client and a server, predict a scheduling time based on a buffer size of the client and a number of the plurality of network connections, wherein the scheduling time indicates a time at which at least one remaining segment is allocated to a part of the plurality of network connections, in response to a portion of the plurality of segments being received using each of the plurality of network connections, and generate scheduling information for allocating the at least one remaining segment to each of the plurality of network connections in a unit of sub-segments at the scheduling time; and a communicator configured to transmit the scheduling information to the server.

9. A non-transitory computer-readable recording medium having recorded thereon a program for executing the method of claim 1.

* * * * *